United States Patent
Eom et al.

(10) Patent No.: US 8,706,334 B2
(45) Date of Patent: Apr. 22, 2014

(54) TECHNIQUE FOR INDUCING ECONOMIC DRIVING OF HYBRID VEHICLE

(75) Inventors: Ki Tae Eom, Gyeonggi-Do (KR); Teh Hwan Cho, Gyeonggi-Do (KR); Han Gil Park, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 13/314,907

(22) Filed: Dec. 8, 2011

(65) Prior Publication Data
US 2013/0090792 A1   Apr. 11, 2013

(30) Foreign Application Priority Data
Oct. 5, 2011   (KR) .................. 10-2011-0101209

(51) Int. Cl.
   *G06G 7/70*   (2006.01)
(52) U.S. Cl.
   USPC .............................. 701/22; 701/123; 340/439
(58) Field of Classification Search
   USPC ........... 701/22, 34.4, 123; 340/439, 438, 450, 340/450.2; 180/65.21
   See application file for complete search history.

(56) References Cited

U.S. PATENT DOCUMENTS

| 6,988,033 | B1 * | 1/2006 | Lowrey et al. | 701/123 |
| 2009/0157244 | A1 * | 6/2009 | Kim | 701/22 |
| 2010/0152941 | A1 * | 6/2010 | Skaff et al. | 701/22 |
| 2011/0224898 | A1 * | 9/2011 | Scofield et al. | 701/200 |
| 2013/0073129 | A1 * | 3/2013 | Martin et al. | 701/22 |

FOREIGN PATENT DOCUMENTS

| JP | 2008-055963 | 3/2008 |
| JP | 2009-126246 | 6/2009 |
| JP | 2010-083209 | 4/2010 |
| JP | 2010-261398 A | 11/2010 |
| KR | 1020100110102 | 10/2010 |
| KR | 1020110057931 | 6/2011 |

* cited by examiner

*Primary Examiner* — Thomas Tarcza
*Assistant Examiner* — Kevin Myhre
(74) *Attorney, Agent, or Firm* — Edwards Wildman Palmer LLP; Peter F. Corless (57) ABSTRACT

Disclosed is a technique for inducing economic driving of a hybrid vehicle. Exemplary embodiments of the present invention is to provide an apparatus and method for inducing economic driving of a hybrid vehicle, which can efficiently induce economic driving by stimulating a driver's desire to achieve better fuel efficiency by calculating an accumulated mileage based on both fuel consumption and battery consumption, displaying the accumulated mileage as a grade, and assigning score according to that particular driver's grade.

16 Claims, 6 Drawing Sheets

TECHNIQUE FOR INDUCING ECONOMIC DRIVING OF HYBRID VEHICLE

CROSS-REFERENCES TO RELATED APPLICATIONS

Priority to Korean patent application number 10-2011-0101209, filed on Oct. 5, 2011, which is incorporated by reference in its entirety, is claimed.

BACKGROUND

1. Field of the Invention

The present invention relates to an apparatus and method for inducing increased economical driving of a hybrid vehicle, and more particularly, to an apparatus and method for inducing economic driving of a hybrid vehicle based on a calculated accumulated mileage.

2. Description of the Related Art

Hybrid vehicles are environmentally-friendly vehicles which increase fuel efficiency and reduce exhaust emissions by having a motor powered by a battery as well as an engine powered by fossil fuel and/or biofuel.

Driving modes in hybrid vehicles include a hybrid electric vehicle (HEV) mode, which, when compared with a vehicle using only an engine, increases fuel efficiency by about 30-40% through alternating power distribution between an engine and a motor during acceleration, an idle stop mode, which raises fuel efficiency by stopping the engine while the engine is idle when the vehicle is stopped, and a regenerative braking mode, which charges the battery using braking and inertia energy generated by the motor that drives the vehicle.

In the past these type of systems have employed an apparatus that calculates gas mileage and a related percentage denoting the level of economy the vehicle is currently being operated at in order to inform driver whether or not the vehicle is reaching its economic potential or not. However, the logistical calculation provided in the above apparatus only accounts for fuel consumption, which is only one of the factors in hybrid systems.

Furthermore, the above mentioned apparatus also only provides the driver with the driver's associated economical percentage which typically does not sufficiently motivate the driver to drive more economically, thereby lowering inducing effects of economic driving.

SUMMARY

The present invention has been made in view of the above problems, and provides a technique for inducing economical driving of a hybrid vehicle, which can efficiently induce economic driving by stimulating a driver's desire to increase fuel efficiency by calculating an accumulated mileage based on fuel consumption and battery consumption, displaying the accumulated mileage in terms of grades, and granting a driver with score according to their associated grade.

In accordance with an aspect of the present invention, an apparatus for inducing economic driving of a hybrid vehicle includes: an accumulated driving distance calculation unit configured to calculate an accumulated driving distance by calculating driving distances using vehicle speed information and summing the calculated driving distances; an accumulated consumption calculation unit configured to calculate an accumulated consumption by calculating both fuel consumption and battery consumption, converted into a unit of measurement equivalent to that of the fuel consumption, and summing the calculated fuel consumption and battery consumption; an accumulated mileage calculation unit configured to calculate an accumulated mileage by dividing the accumulated driving distance calculated by the accumulated driving distance calculation unit by the accumulated consumption calculated by the accumulated consumption calculation unit; a level detection unit configured to detect a level of accumulated mileage calculated by the accumulated mileage calculation unit; a controller configured to synchronize the accumulated driving distance calculation unit with the accumulated consumption calculation unit, assign a score corresponding to the level detected by the level detection unit, and control a display unit to display a graphic image corresponding to the corresponding detected level; and a display unit configured to display a graphic image corresponding to the corresponding level.

In accordance with another aspect of the present invention, a method to induce economic driving of a hybrid vehicle includes: calculating, by a control unit, an accumulated driving distance by calculating a plurality of driving distances using vehicle speed information and summing the calculated driving distances; calculating, by the control unit, an accumulated consumption by calculating fuel consumption and battery consumption, converted into a unit of measurement equivalent to that of the fuel consumption, and summing the calculated fuel consumption and battery consumption; calculating, by the control unit, an accumulated mileage by dividing the accumulated driving distance by the accumulated consumption; detecting, by the control unit, a level associated with the calculated accumulated mileage; assigning, by the control unit, a score to the detected level; and displaying, by a display unit, a graphical image corresponding to the detected level.

BRIEF DESCRIPTION OF THE DRAWINGS

The objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term fuel cell "vehicle" or "vehicular" or other similar term as used herein is inclusive of all types of fuel cell motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric motor powered fuel cell vehicles, auxiliary plug-in fuel cell hybrid electric vehicles, hydrogen-powered fuel cell vehicles and other alternative fuel cell vehicles (e.g., fuels derived from resources other than petroleum).

Figure 1:
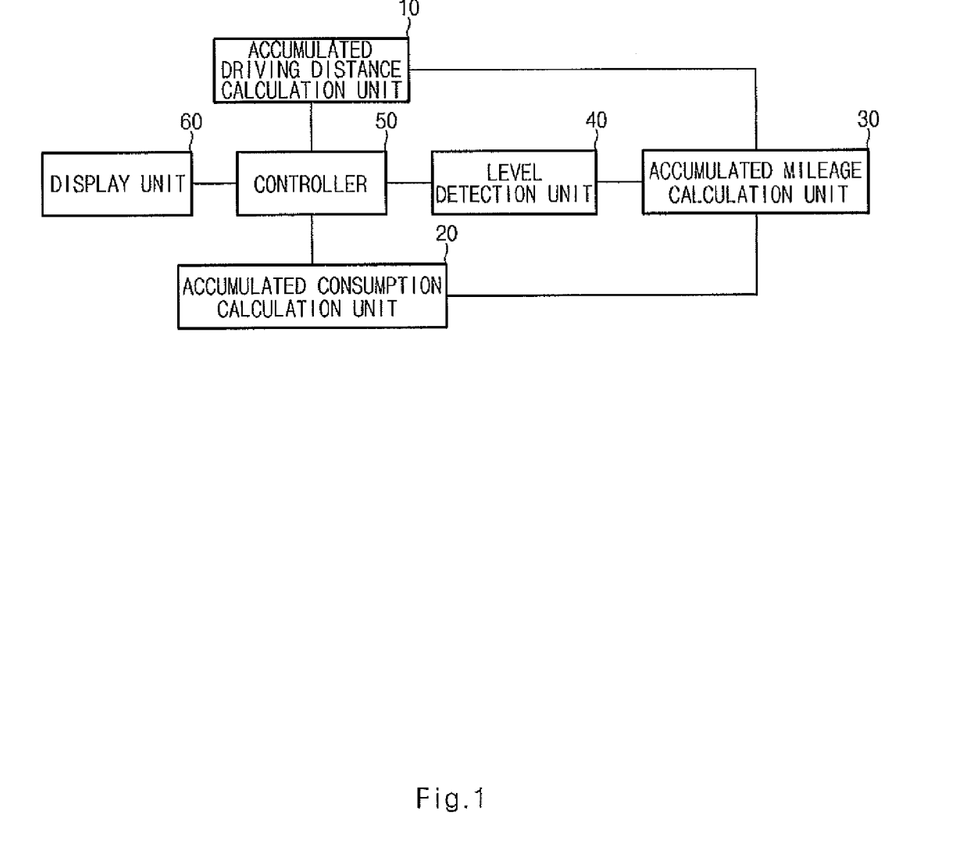
FIG. 1 illustrates an apparatus for inducing economic driving of a hybrid vehicle according to an exemplary embodiment of the present invention.

Referring to FIG. 1, an apparatus for inducing economic driving of a hybrid vehicle includes an accumulated driving distance calculation unit 10 (a first unit), an accumulated consumption calculation unit 20 (a second unit), an accumulated mileage calculation unit 30 (a third unit), a level detection unit 40 (a fourth unit), and a display unit 60. It should be noted, however, that the above first, second, third and fourth units may be embodied as multiple separate control units or controllers or they may be embodied as a single device, i.e. a controller made up of a plurality of units. Accordingly, a control unit may be interpreted as including a plurality of calculation, detection or other control units necessary to accomplish the exemplary embodiment of the present invention.

Specifically, the accumulated driving distance calculation unit 10 calculates the vehicle's driving distance using the vehicle's speed information, and sums the calculated distances per preset unit (e.g., 20 ms). That is, the driving distance for each 20 ms is calculated and the calculated distances are summed to reveal an aggregated value. For example, 5 distances may be summed for one second.

The accumulated consumption calculation unit 20 calculates the total consumption (hereinafter, called "consumption") consisting of the sum of fuel consumption and battery consumption converted, into a unit of measurement equivalent to that of fuel consumption, and then sums the calculated consumptions per preset time (e.g., 20 ms). That is, the accumulated consumption calculation unit 20 calculates the consumption based on Formula 1 below.

$$\text{Consumption} = \text{Fuel consumption} + (\text{conversion factor} \times \text{battery consumption}) \quad \text{[Formula 1]}$$

The conversion factor is a constant to make the battery consumption into a unit of measurement equivalent to that of the fuel consumption. In the present embodiment, 20 ms has been used as an example for intervals of accumulated time of the accumulated driving distance calculation unit 10 and accumulated time of the accumulated consumption calculation unit 20, but the present invention is not limited to this example. Furthermore, constant intervals may be preferably set at which time two or more units within a control unit may be synchronized.

The accumulated mileage calculation unit 30 calculates accumulated mileage by dividing the accumulated driving distance by the accumulated consumption. When calculating the accumulated mileage, the accumulated mileage calculation unit 30 can calculate accumulated mileage at the same intervals of accumulated time as the accumulated driving distance calculation unit 10 and the accumulated consumption calculation unit 20, or the accumulated mileage calculation unit 30 can calculate accumulated mileage at different intervals of accumulated time as the accumulated driving distance calculation unit 10 and the accumulated consumption calculation unit 20.

For example, the accumulated mileage calculation unit 30 can calculate accumulated mileage every two seconds. Here, the accumulated mileage is calculated by dividing accumulated driving distance measured every two seconds by accumulated consumption measured every two seconds.

A level detection unit 40 stores level information about accumulated mileage according to sections, and detects/determines the level of the accumulated mileage calculated by the accumulated mileage calculation unit 30 based on the stored level information. The level detection unit 40 can detect the level for the accumulated mileage at the same intervals as those of the accumulated mileage calculation unit 30, or it can detect a corresponding level related to the accumulated mileage at different intervals from those of the accumulated mileage calculation unit 30.

For example, if the accumulated mileage calculation unit 30 calculates accumulated mileage every two seconds and the level detection unit 40 detects the level for the accumulated mileage every 2 minutes and 30 seconds, the average of accumulated mileages calculated for 2 minutes and 30 seconds is calculated and the level of the average accumulated mileage is detected. The level detection time interval may be set to a longer time interval than the accumulated mileage calculation tune interval in order to prevent frequent changes of the level information displayed on the display unit 60.

Furthermore, the level detection unit 40 may correct the accumulated mileage calculated by the accumulated mileage calculation unit 30 in order to normalize abnormal accumulated mileage which is temporarily generated. That is, when the level corresponding to the accumulated mileage currently calculated by the accumulated mileage calculation unit 30 is greater or smaller than the level corresponding to the previously calculated accumulated mileage by two or more levels, the level of the currently calculated accumulated mileage is set to be greater or smaller than the level of the previously calculated accumulated mileage by one level.

For example, it is assumed in the illustrative embodiment that where the accumulated mileage is between 5 km/L and 10 km/L is level 1, where the accumulated mileage is between 10 km/L and 15 km/L is level 2, where the accumulated mileage is between 15 km/L and 20 km/L is level 3, where the accumulated mileage is between 20 km/L and 25 km/L is level 4, where the accumulated mileage is between 25 km/L and 30 km/L is level 5, where the accumulated mileage is between 30 km/L and 35 km/L is level 6, where the accumulated mileage is between 35 km/L and 40 km/L is level 7, and where the accumulated mileage is greater than 40 km/L is level 8.

When the accumulated mileage is 27 km/L and the previous accumulated mileage is 17 km/L, the level of the current accumulated mileage is 5, and the level of the previous accumulated mileage is 3. Here, because the level of the current accumulated mileage is greater than the level of the previous accumulated mileage by two levels, the level of the current accumulated mileage is set to 4.

Likewise, when the current accumulated mileage is 15 km/L and the previous accumulated mileage is 35 km/L, the level of the current accumulated mileage is 3 and the level of the previous accumulated mileage is 7. Here, because the level of the current accumulated mileage is smaller than the previous accumulated mileage by more than two levels, the level of the current accumulated mileage is set to 6.

The above mentioned level correction process can also be applied to the average accumulated mileage in the same manner.

The controller 50 (which as noted above may be incorporated into the control unit) synchronizes the operation of the accumulated driving distance calculation unit 10 and the accumulated consumption calculation unit 20, assigns a score corresponding to the level transmitted from the level detection unit 40, and controls the display unit 60 to display graphical images according to the level transmitted from the level detection unit 40 and accumulated scores. In some embodiments, the controller 50 may assign a score only when the level transmitted from the level detection unit 40 is at the highest level. The controller 50 also manages assigned scores.

Furthermore, the controller 50 can perform various complementary functions so that an arbitrary operation for scores is impossible, and can use "HCU C-CAN Message CF_Hcu_PgmRun5" which increases by one per 100 ms.

The display unit 60 displays graphical images corresponding to the level and accumulated scores achieved by the driver. Examples of such displays are shown in FIGS. 2 to 4.

Figure 2:
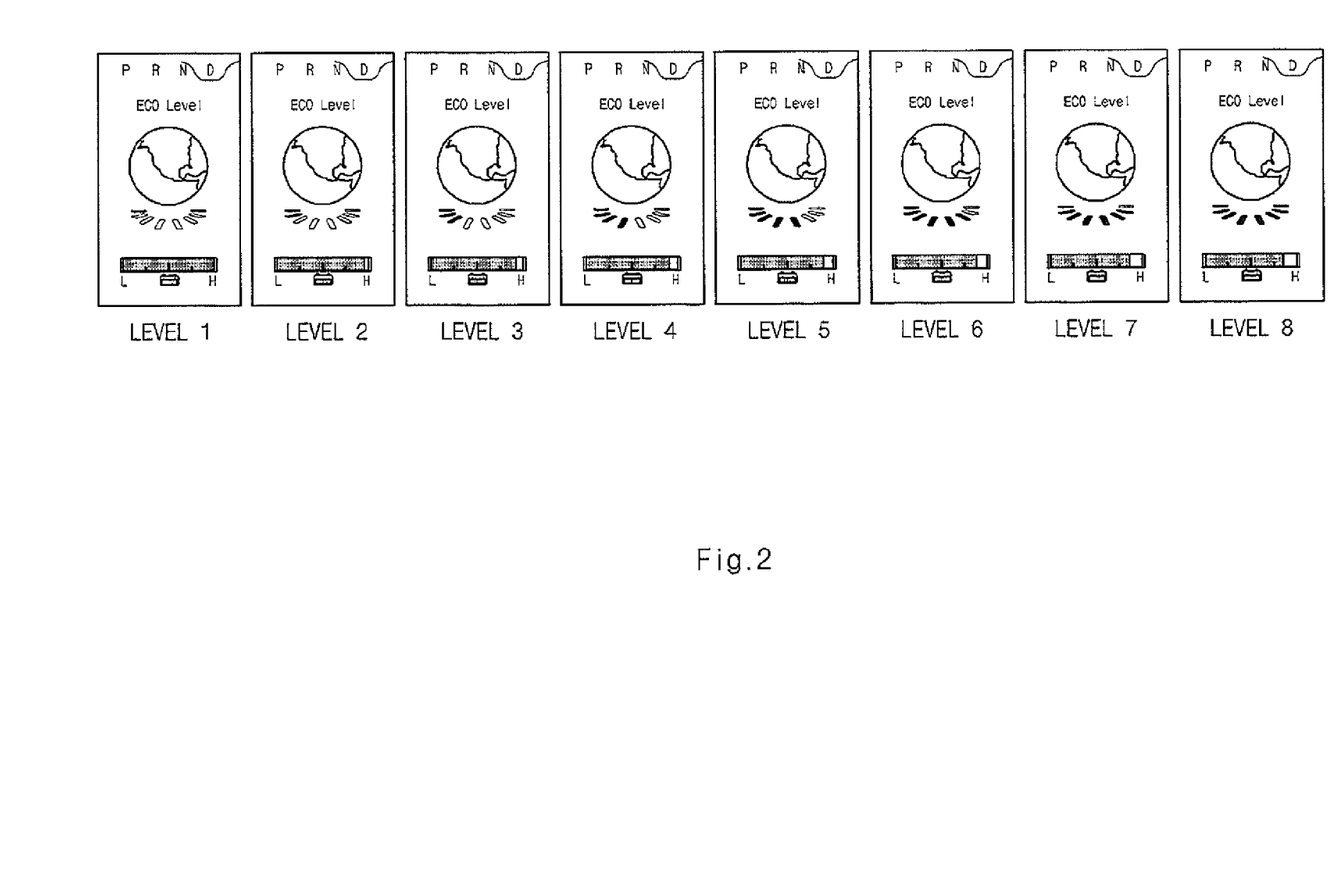
FIG. 2 illustrates graphic images corresponding to levels according to an exemplary embodiment of the present invention.

FIG. 2 illustrates graphic images corresponding to levels, in which bars symbolizing the level (e.g., three bars in the case of level 3) are displayed under the earth image, and the earth image gets greener as the level increases, thereby motivating the driver to drive economically making it more like a competition or a game.

Figure 3:
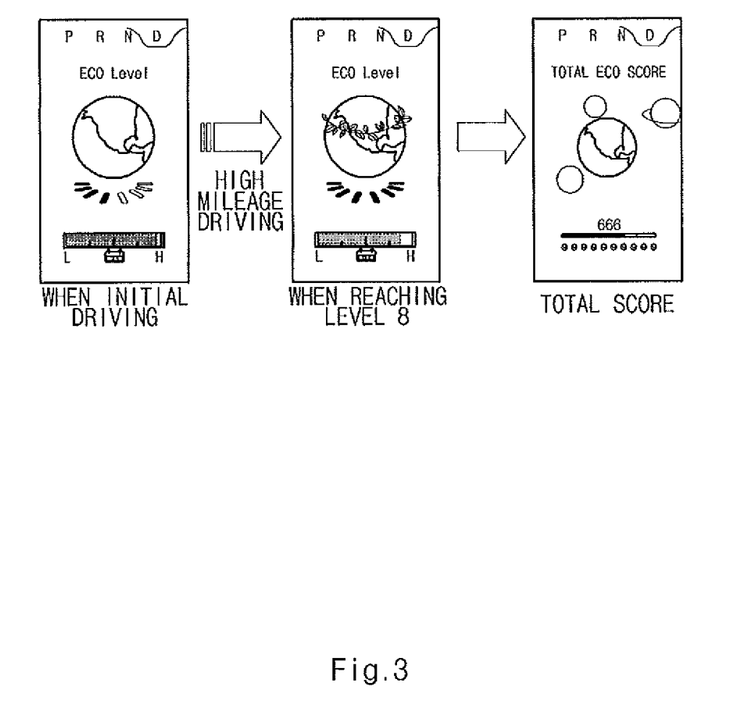
FIG. 3 illustrates graphic images granting scores corresponding to levels according to an exemplary embodiment of the present invention.
Figure 4:
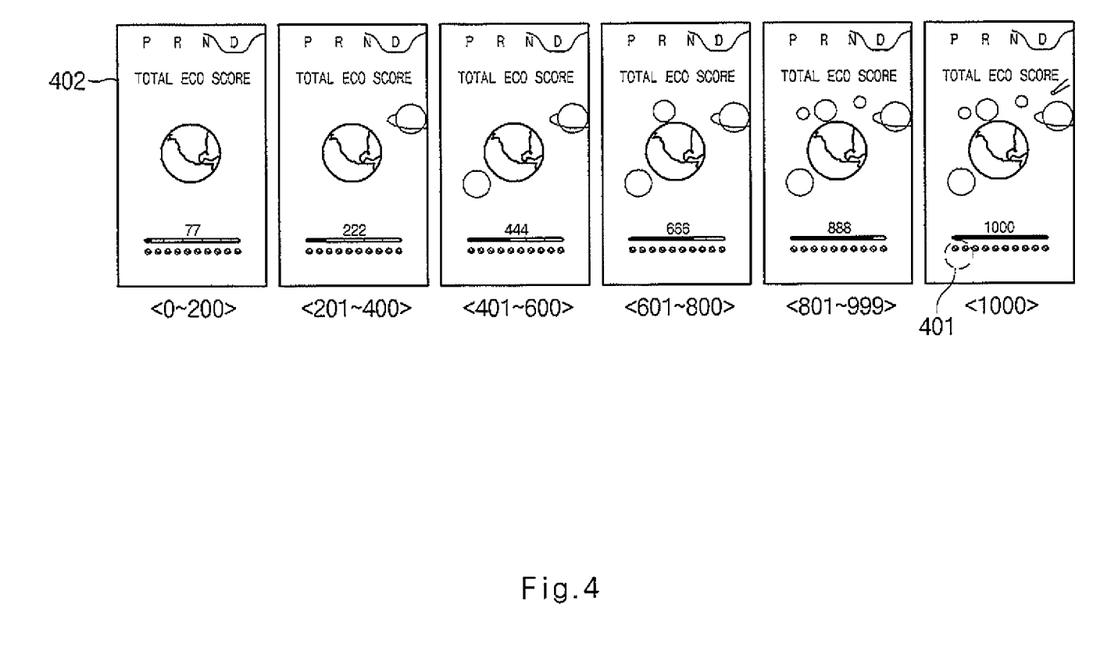
FIG. 4 illustrates graphic images corresponding to score sections according to an exemplary embodiment of the present invention.

FIG. 3 illustrates graphic images granting scores corresponding to levels. As illustrated in FIG. 3, when the vehicle is initially started, the graphical image corresponding to level 4 is displayed, when reaching the highest level 8, the score corresponding to level 8 is allotted, and accumulated scores, which reflect the allotted scores, are displayed.

Furthermore, it should be noted that multiple users/drivers may be assigned different scores which are displayed in a graphical comparison to provide even further competitive characteristics.

FIG. 4 illustrates graphical images corresponding to score sections. In the illustrative embodiment, one planet is added per score section, and when reaching 1000 points, the graphic image returns to the image of reference numeral 402, but where one earth symbol 401, symbolizing 1000 points, is added at the bottom.

Figure 5:
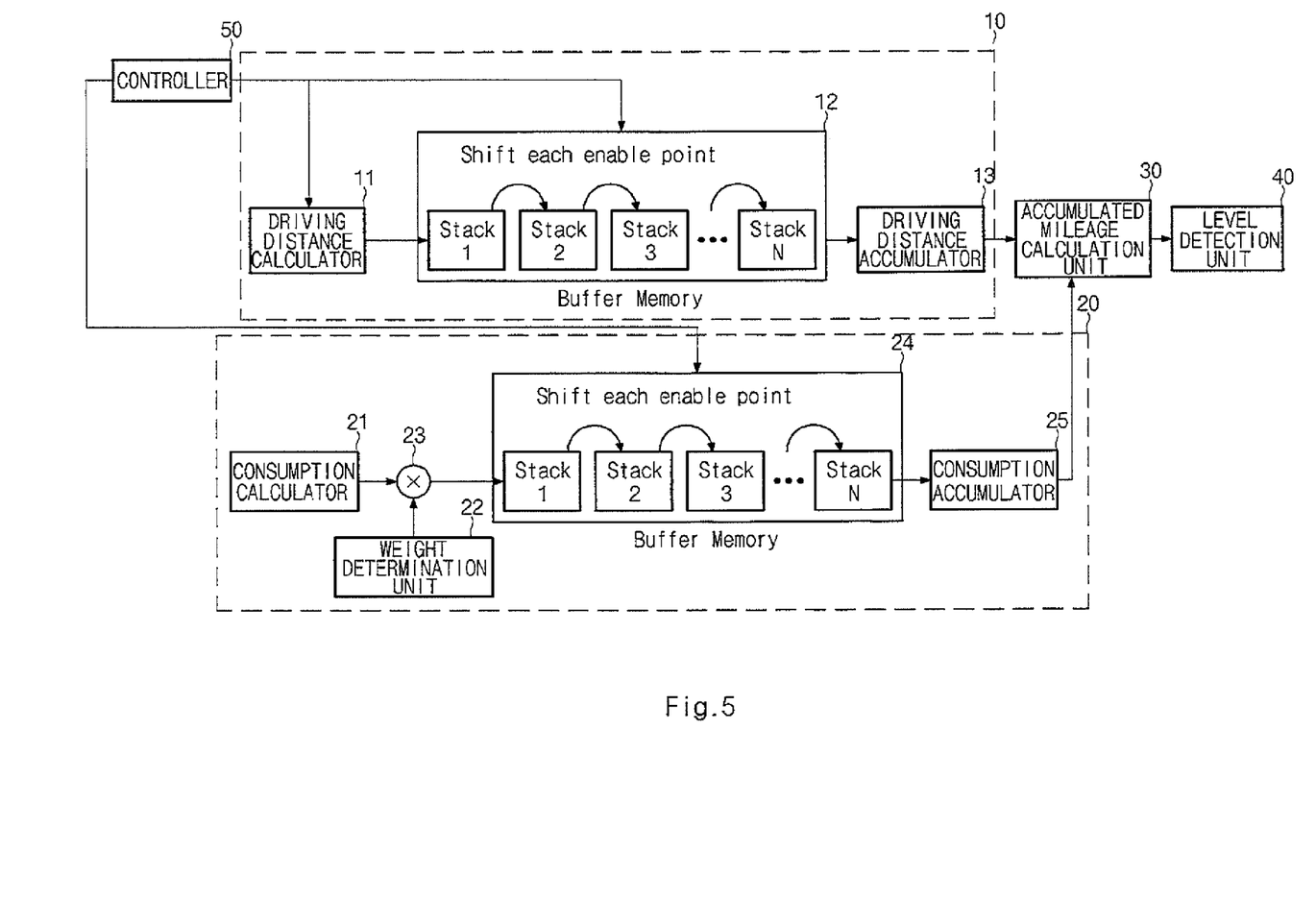
FIG. 5 illustrates a detailed configuration of an apparatus for inducing economic driving of a hybrid vehicle according to an exemplary embodiment of the present invention.

Hereinafter, the accumulated driving distance calculation unit 10 and the accumulated consumption calculation unit 20 will be explained in detail with reference to FIG. 5. As illustrated in FIG. 5, the accumulated driving distance calculation unit 10 may include a driving distance calculator 11, a buffer memory 12 and a driving distance accumulator 13. Specifically, the driving distance calculator 11 calculates driving distance by multiplying driving speed by time. Here, because the time used in calculating the driving distance is very short time (e.g., 20 ms), the change in vehicle speed does not have a significant effect on the driving distance.

The buffer memory 12 is a buffer with stack structure, and data transfer between stacks is made gradually in preset time units (e.g., 20 ms). The data transfer can be performed by a buffer memory controller (not shown) positioned within the buffer memory, or the controller 50. The buffer memory 12 gradually moves and stores driving distances calculated in the driving distance calculator 11 between stacks.

For example, assuming that there are a total of 10 stacks (Stack 1, Stack 2, Stack 3, Stack 4, Stack 5, Stack 6, Stack 7, Stack 8, Stack 9, and Stack 10), a first driving distance calculated first in the driving distance calculator 11 is stored in Stack 1. If the driving distance calculator 11 calculates a second driving distance, the buffer memory 12 moves the first driving distance stored in Stack 1 to Stack 2 and stores the first driving distance in Stack 2, and stores the second driving distance in Stack 1.

In such a manner, the driving distances are gradually stored in stacks. Thereafter, in case an eleventh driving distance is calculated, the eleventh driving distance is stored in Stack 1 after consecutive movement, and the first driving distance stored in Stack 10 is outputted to the driving distance accumulator 13 and is then deleted.

The driving distance accumulator 13 sums driving distances stored in the final stack of the buffer memory 12 over a preset period of time (e.g., 20 ms). That is, the driving distances stored in the final stack are accumulated per preset time.

As illustrated in FIG. 5, the accumulated consumption calculation unit 20 may include a consumption calculator 21, a weight determination unit 22, a weight giver 23, a buffer memory 24 and a consumption accumulator 25. Specifically, first, the consumption calculator 21 calculates consumption which is the sum of fuel consumption and battery consumption converted into a unit of measurement equivalent to that of the fuel consumption.

The weight determination unit 22 determines the weight according to the number of rapid accelerations and rapid decelerations. As the number of rapid accelerations and rapid decelerations increases, the weight is set to a high value, and the mileage is calculated as a low value. Rapid deceleration in the exemplary embodiment of the present invention means vehicle speed decreases more than 30 kph per second, and rapid acceleration means vehicle speed increases more than 30 kph per second.

As an example, weights can be given as shown in Table 1 below.

TABLE 1

| Number of rapid acceleration and rapid deceleration | Weight |
| --- | --- |
| 0 | 0 |
| 1-3 | 1.03 |
| 4-6 | 1.05 |
| 7-9 | 1.07 |
| 10 or more | 1.1 |

The weight giver 23 gives the weight determined by the weight determination unit 22 to the consumption calculated by the consumption calculator 21. That is, the weight giver 23 multiplies consumption calculated by the consumption calculator 21 by the weight determined by the weight determination unit 22.

The buffer memory 24 has the same structure and function as those of the buffer memory 12, and the consumption, which was given weight in the weight giver 23, is gradually stored and moved between stacks similar to driving distances in buffer 12.

The consumption accumulator 25 sums consumption stored in the final stack of the buffer memory 24 per preset time (e.g., 20 ms). That is, the consumption stored in the final stack per preset time is accumulated.

Figure 6:
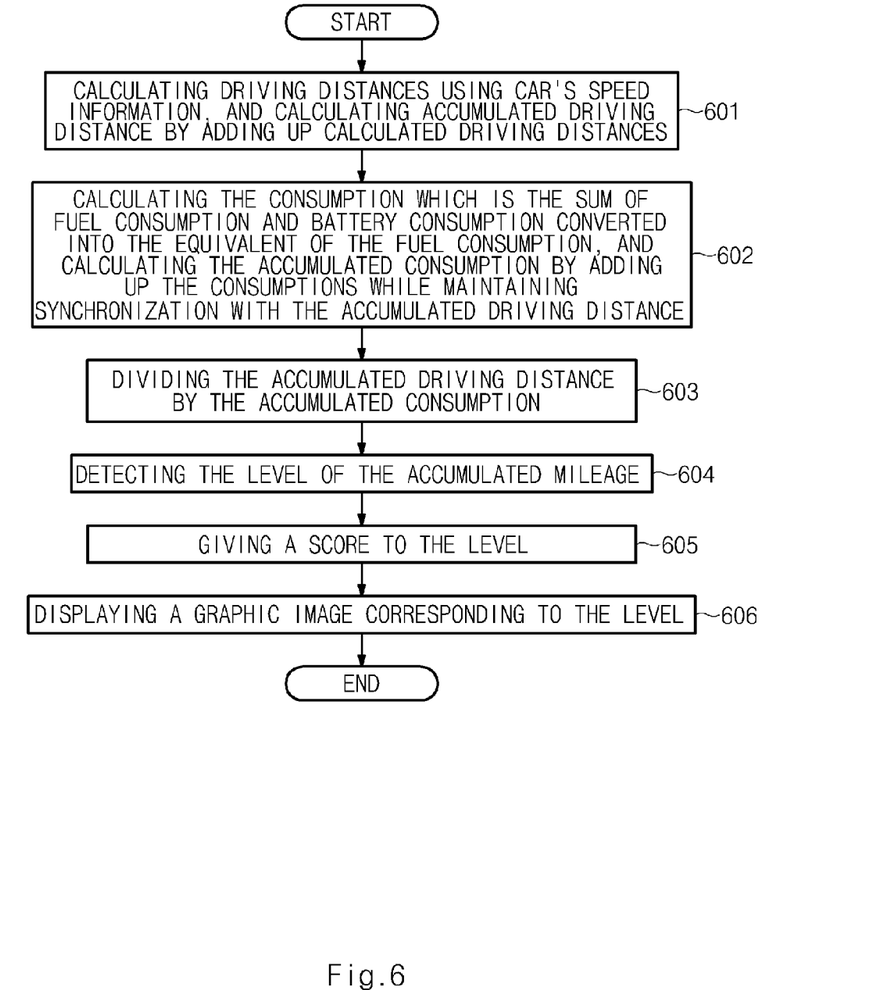
FIG. 6 is a flowchart illustrating a method for inducing economic driving of a hybrid vehicle according to an exemplary embodiment of the present invention.

FIG. 6 is flowchart illustrating an exemplary method for inducing economic driving of a hybrid vehicle.

First, driving distance is calculated using the vehicle's speed information, and accumulated driving distance is calculated by summing the calculated driving distances (601).

Thereafter, the consumption, which is the sum of the fuel consumption and the battery consumption converted into a unit of measurement equivalent to that of the fuel consumption, is calculated, and the accumulated consumption is calculated by summing the consumptions, and the calculation process is synchronized with the accumulated driving distance calculation process 601 (602).

Thereafter, the accumulated mileage is calculated by dividing the accumulated driving distance by the accumulated consumption (603), and the level of the calculated accumulated mileage is detected (604). A score is then given to the detected level (605). Subsequently, a graphical image corresponding to the detected level is displayed (606).

According to the present invention, economic driving can be effectively induced by creating a competitive scoring or gaming structure to represent a given driver's respective fuel efficiency by calculating accumulated mileage based on both fuel consumption and battery consumption, displaying the accumulated mileage by grades, and assigning a score according to the grade.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for inducing economical driving of a hybrid vehicle, the apparatus comprising:
    a first unit configured to calculate an accumulated driving distance;
    a second unit configured to calculate an accumulated consumption;
    a third unit configured to calculate an accumulated mileage;
    a fourth unit configured to detect a level of an accumulated mileage calculated by the third unit; and
    a controller configured to assign a score corresponding to the detected level, and control a display unit to display a graphical image corresponding to the detected level,
    wherein the fourth unit sets the level of a current calculated accumulated mileage to be either greater or smaller than the level of a previous calculated accumulated mileage by one level when the level of the current calculated accumulated mileage is either greater or smaller than the level of the previous calculated accumulated mileage by two or more levels.

2. The apparatus of claim 1, wherein the accumulated consumption calculation unit calculates the consumption using Formula A below, wherein a conversion factor is a constant to convert the battery consumption into a unit of measurement equivalent to that of the fuel consumption Consumption=Fuel consumption+(conversion factor× battery consumption)     [Formula A].

3. The apparatus of claim 1, wherein the controller is further configured to synchronize the first unit with the second unit.

4. The apparatus of claim 1, wherein the third unit is further configured to accumulate mileage at longer intervals than the intervals used by the first unit.

5. The apparatus of claim 1, wherein the fourth unit detects the level for accumulated mileage based on the data received by the first, second and third units.

6. The apparatus of claim 1, wherein the fourth unit calculates the average of the accumulated mileages calculated by the third unit, and detects the level of the average accumulated mileage.

7. The apparatus of claim 1, wherein the controller assigns a score when the level transmitted from the level detection unit is at its highest level.

8. The apparatus of claim 1, wherein the controller accumulates and manages the assigned score.

9. A method for inducing economic driving of a hybrid vehicle, the method comprising:
    calculating, by a control unit, an accumulated driving distance by calculating driving distances using vehicle speed information per a unit of time and summing the calculated driving distances;
    calculating, by the control unit, an accumulated consumption by calculating fuel consumption and battery consumption converted into an equivalent unit of measurement of the fuel consumption and summing the calculated fuel consumption and battery consumption;
    calculating, by the control unit, an accumulated mileage by dividing the accumulated driving distance by the accumulated consumption;
    detecting, by the control unit, a level of the calculated accumulated mileage;
    assigning, by the control unit, a score to the detected level; and
    displaying, by a display unit, a graphical image corresponding to the detected level,
    wherein detecting the level further comprises setting the level of the current calculated accumulated mileage to be either greater or smaller than the level of the previous calculated accumulated mileage by one level when the level of the current calculated accumulated mileage is either greater or smaller than the level of the previous calculated accumulated mileage by two or more levels.

10. The method of claim 9, wherein calculating an accumulated consumption is performed using Formula B below wherein a conversion factor is a constant to convert the battery consumption into a unit of measurement equivalent to that of the fuel consumption Consumption=Fuel consumption+(conversion factor× battery consumption)     [Formula B].

11. The method of claim 9, wherein the control unit comprises a first and second unit and further comprising synchronizing the calculation provided by the first and second unit.

12. The method of claim 9, wherein calculating an accumulated mileage calculates accumulated mileage at longer intervals than the intervals used in calculating the accumulated driving distances.

13. The method of claim 9, wherein detecting the level further comprises detecting the level for accumulated mileage based on the synchronized calculations.

14. The method of claim 9, wherein the step of detecting the level includes calculating the average of the calculated accumulated mileage, and the level for the average accumulated mileage is detected.

15. The method of claim 9, wherein a score is assigned when the detected level is at its highest level.

16. The method of claim 9, wherein assigning a score further comprises:
    accumulating and managing the assigned scores of one or more drivers.

* * * * *